(12) United States Patent
Chen (10) Patent No.: US 9,434,351 B2
(45) Date of Patent: Sep. 6, 2016

(54) SECURITY BATTERY APPARATUS AND ITS METHOD

(71) Applicant: Liang-Yuan Chen, Santa Ana, CA (US)

(72) Inventor: Liang-Yuan Chen, Santa Ana, CA (US)

( * ) Notice: Subject to any disclaimer, the term of this patent is extended or adjusted under 35 U.S.C. 154(b) by 28 days.

(21) Appl. No.: 14/522,431

(22) Filed: Oct. 23, 2014

(65) Prior Publication Data

US 2016/0114763 A1    Apr. 28, 2016

(51) Int. Cl.
*B60R 25/10*    (2013.01)
*B60R 25/045*    (2013.01)

(52) U.S. Cl.
CPC .................................. *B60R 25/045* (2013.01)

(58) Field of Classification Search
None
See application file for complete search history.

(56) References Cited

U.S. PATENT DOCUMENTS

| | | | | |
|---|---|---|---|---|
| 4,037,194 A | * | 7/1977 | Boyden | B60R 25/1004 331/108 D |
| 4,223,298 A | * | 9/1980 | Bernier | B60R 25/1018 180/287 |
| 4,288,778 A | * | 9/1981 | Zucker | B60R 25/04 180/287 |
| 4,682,062 A | * | 7/1987 | Weinberger | B60R 25/045 180/287 |
| 4,832,146 A | * | 5/1989 | Luby | B60R 25/04 180/287 |
| 4,958,084 A | * | 9/1990 | Carlo | B60R 25/04 307/10.1 |
| 5,023,591 A | * | 6/1991 | Edwards | B60R 25/04 180/287 |
| 5,224,567 A | * | 7/1993 | Tomlinson | B60R 25/04 180/287 |
| 5,581,231 A | * | 12/1996 | Cardoso | B60R 25/045 180/287 |

* cited by examiner

*Primary Examiner* — Travis Hunnings
(74) *Attorney, Agent, or Firm* — Tsz Lung Yeung (57) ABSTRACT

A security battery apparatus includes a security housing, a security adapter, a current detector, a control resistance, a relay circuitry, and a controller module. The security housing. The relay circuitry is electrically connected to the positive terminal of the rechargeable battery, and is connected to the control resistance in parallel. The relay circuitry is normally opened so that only a relatively smaller current is allowed to pass through the security adapter through the control resistance. The controller module is received in the security housing and is programmed to electrically activate the relay circuitry when a security identification is received, so as to allow a relatively larger current to by-pass the control resistance and pass through the security adapter for starting up the vehicle.

27 Claims, 8 Drawing Sheets

SECURITY BATTERY APPARATUS AND ITS METHOD

BACKGROUND OF THE PRESENT INVENTION

1. Field of Invention

The present invention relates to a vehicle security device, and more particularly to a security battery apparatus which can be used to prevent a vehicle from being started so as to prevent the vehicle from being stolen.

2. Description of Related Arts

A conventional anti-theft battery, such as an anti-theft battery for an automobile disclosed in U.S. Pat. No. 4,832,146 to Luby, comprises a battery having a first positive and a negative terminal, a housing mounted on the battery, a second positive terminal electrically extended from the first positive terminal through the housing, a constant power supply electrically connected to the first positive terminal and the second positive terminal, a key actuated switch electrically connected to the second positive terminal and the constant power supply. When the key actuated switch is turned off by a designated key, the positive terminal of the battery will be electrically disconnected. When the key actuated switch is turned on, the engine of the automobile can be started.

There are several disadvantages in relation to the above-mentioned conventional anti-theft battery. First, the actuation of the key actuated switch must be by a physical key. In other words, a user has to open the hood of the automobile to access the key actuated switch every time he wishes to turn on or turn off the anti-theft battery. As one can imagine, this operation mechanism brings extreme hassle to the user.

Second, the conventional anti-theft battery is very easy to be broken. For example, an invader may easily open the hood of the vehicle and break the key actuated switch. Alternatively, the invader may easily break the housing and jump-start the automobile. In these situations, the invader may start the engine of the automobile by acquiring adequate electricity from the battery.

As a result, there is a need for a reliable, difficult-to-access, and remotely controlled security battery apparatus.

SUMMARY OF THE PRESENT INVENTION

An objective of the present invention is to provide a security battery apparatus which can be used to prevent a vehicle from being started so as to prevent the vehicle from being stolen.

Another objective of the present invention is to provide a security battery apparatus which comprises a security housing and a security adapter for preventing unauthorized access to the electrical terminals of a rechargeable battery of the vehicle.

Another objective of the present invention is to provide a security battery apparatus which comprises a connecting cable constituted by a plurality of cable members bounded to form a flexible and substantially flat contour for substantially the difficulty of jump starting or re-wiring the connecting cable.

Another objective of the present invention is to provide a security battery apparatus which utilizes a wide variety of security devices for preventing unauthorized start-up of a vehicle.

Another objective of the present invention is to provide a method preventing unauthorized start-up of a vehicle by using a controller module and based on detected current drawn from the rechargeable battery of the vehicle.

In one aspect of the present invention, it provides a security battery apparatus for a vehicle which has a rechargeable battery having a positive terminal and a negative terminal, the security battery module comprising:

a security housing covering at least said positive terminal of said rechargeable battery of said vehicle;

a security adapter provided on said security housing and electrically connected to said positive terminal of said rechargeable battery;

a control resistance electrically connected to said positive terminal of said rechargeable battery;

a relay circuitry electrically connected to said positive terminal of said rechargeable battery, and is connected to said control resistance in parallel, said relay circuitry being normally opened so that only a relatively smaller current is allowed to pass through said security adapter through said control resistance; and a controller module which is received in said security housing and electrically connected to said relay circuitry, said controller module being programmed to electrically activate said relay circuitry when a security identification is received, so as to allow a relatively larger current to by-pass said control resistance and pass through said security adapter for starting up said vehicle.

In another aspect of the present invention, it provides a method of preventing unauthorized start-up of a vehicle, comprising the steps of:

(a) electrically connecting a security terminal to a positive terminal of a rechargeable battery used in a vehicle;

(b) accommodating the security terminal in a security housing which is securely locked for preventing unauthorized access to the security terminal;

(c) electrically connecting the security terminal to a controller module, a relay circuitry which is normally opened and connected to said controller module, and a control resistance, wherein the controller module and the control resistance are connected in parallel so as to normally allow a relatively smaller current to pass from said rechargeable battery to said security terminal through said control resistance;

(d) detecting a current drawn from the rechargeable battery by a current detector, wherein the value of the detected current is sent to the controller module;

(e) activating at least one security device by the controller module when a security breach is detected based on the detected current; and (f) activating said relay circuitry by said controller module when a predetermined security identification is received by the controller module, so as to allow a relatively larger current to pass from said rechargeable battery to said security terminal.

DETAILED DESCRIPTION OF THE PREFERRED EMBODIMENT

The following detailed description of the preferred embodiment is the preferred mode of carrying out the invention. The description is not to be taken in any limiting sense. It is presented for the purpose of illustrating the general principles of the present invention.

Referring to FIG. 1 to FIG. 7 of the drawings, a security battery apparatus for an automobile according to a preferred embodiment of the present invention is illustrated. The automobile has a rechargeable battery 70 having a positive terminal 71 and a negative terminal 72. Broadly, the security battery apparatus comprises a security housing 10, a security adapter 20, a current detector 30 electrically connected to the security adapter 20, a controller module 40, a relay circuitry 64, and a control resistance 80.

Figure 1:
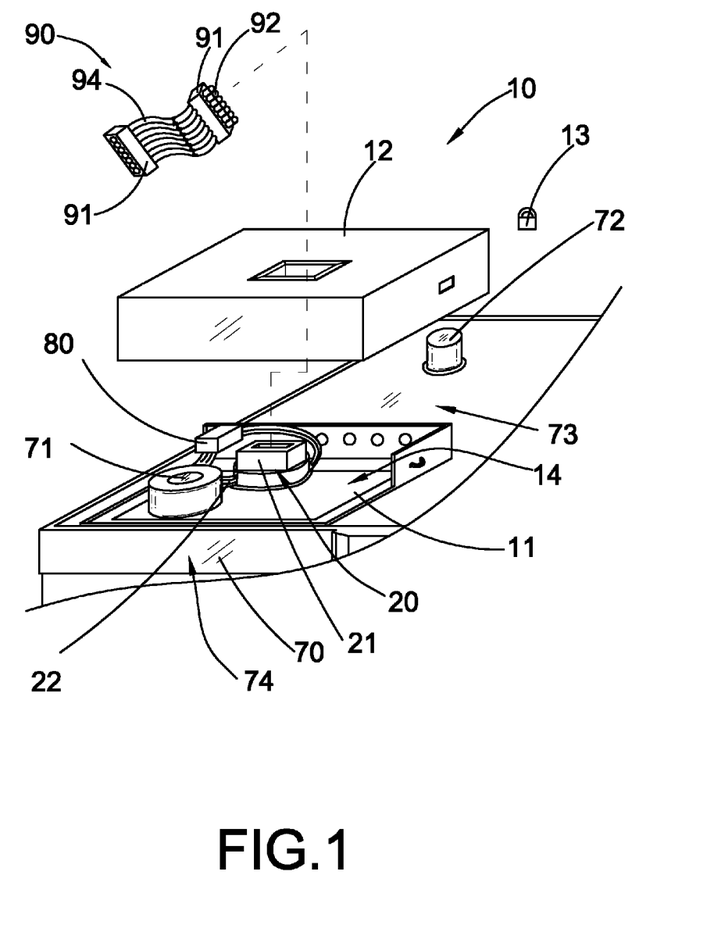
FIG. 1 is a perspective view of a security battery apparatus according to a preferred embodiment of the present invention.
Figure 2:
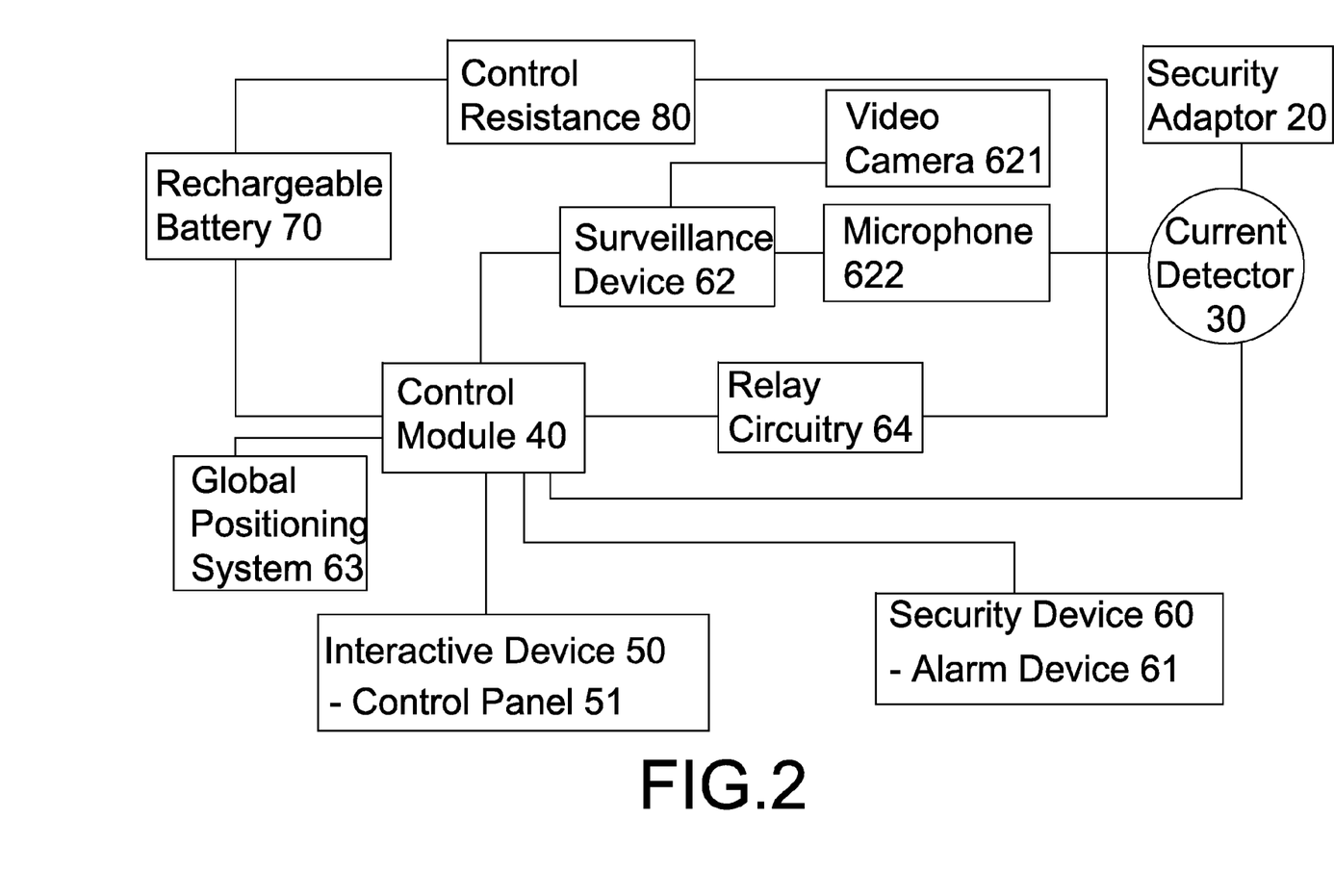
FIG. 2 is a block diagram of the security battery apparatus according to the preferred embodiment of the present invention.

The security housing 10 covers at least the positive terminal 71 of the rechargeable battery 70 of the vehicle. The security adapter 20 is provided on the security housing 10 and is electrically connected to the positive terminal 71 of the rechargeable battery 70.

The control resistance 80 is electrically connected to the positive terminal 71 of said rechargeable battery 70.

The relay circuitry 64 is electrically connected to the positive terminal of the rechargeable battery 70, and is connected to the control resistance 80 in parallel. The relay circuitry 64 is normally opened so that only a relatively smaller current is allowed to pass through the security adapter 20 through the control resistance 80. The relatively smaller currents are for operating electronic devices in the vehicle.

The controller module 40 is received in the security housing 10 and is electrically connected to the relay circuitry 64. The controller module 40 is programmed to electrically activate the relay circuitry 64 when a security identification is received, so as to allow a relatively larger current to by-pass the control resistance 80 and pass through the security adapter 20 for starting up the vehicle.

The rechargeable battery 70 has a top surface 73 and a plurality of side surfaces 74, and is normally received in the automobile in a space covered by a hood thereof. The positive terminal 71 and the negative terminal 72 may be provided on the top surface 73 or one of the side surfaces 74 of the rechargeable battery 70. However, as an exemplary illustration of the present invention, the positive terminal 71 and the negative terminal 72 of the rechargeable battery 70 are designed to be provided on the top surface 73 thereof.

According to the preferred embodiment of the present invention, the security housing 10 is provided on the rechargeable battery 70 for covering at least the positive terminal 71 thereof. The security housing 10 comprises a first housing member 11 mounted on the rechargeable battery 70, a second housing member 12 detachably mounted on the first housing member 11, and a locking device 13 provided on the first housing member 11 and the second housing member 12 for selectively locking the first housing member 11 with the second housing member 12. The first housing member 11 and the second housing member 12 are normally locked by the locking device 13 so that unauthorized person may not easily gain access to the positive terminal 71 of the rechargeable battery 70. The first housing member 11 is securely mounted on the rechargeable battery 70 so that authorized persons may not be easily detach the security housing 10 from the rechargeable battery 70. The locking device 13 may be a conventional lock, or a lock digitally controlled by passwords and may also be connected to the controller module 40.

The first housing member 11 and the second housing member 12 define a receiving cavity 14 for receiving the controller module 40 and the current detector 30. The security adapter 20 is mounted on the second housing member 12 for electrically connecting to other electrical components of a vehicle, preferably via a main power cable of the vehicle. When only the electrical accessories of the vehicles are turned on or activated, relatively smaller currents are drawn from the rechargeable battery 70 through the control resistance 80. However, when the engine of the vehicle needs to be started, a relatively larger current is required from the rechargeable battery 70 for supporting the initial starting of the vehicle. The second housing member 12 has a through opening 121 through which the security adapter 20 is electrically accessed or connected to by the main power cable of the vehicle.

The current detector 30 is electrically connected to the between the controller module 40 and the security adapter 20 to detect the current drawn from the rechargeable battery 70. A corresponding signal is sent to the controller module 40. When a predetermined sequence of relatively smaller currents are detected, the controller module 40 is arranged to electrically activate the relay circuitry 64 to allow passage of the relatively larger current from the rechargeable battery 70 to the security adapter 20. In this scenario, the relatively larger current bypasses the control resistance 80. According to the preferred embodiment of the present invention, the controller module 40 comprises an Integrated Circuit (IC) having a microcontroller chipset which may be programmed to control the operation of the relay circuitry 64 in responsive to the currents detected by the current detector 30 and/or the input of the security identification.

It is worth mentioning that the controller module 40 does not prohibit passage of relatively smaller currents from the rechargeable battery 70 to the main power cable of the vehicle because the smaller currents are needed for turning on lights, audio equipment, or other accessories of the vehicle. This is accomplished by allowing relatively smaller currents to pass from the rechargeable battery 70 through the control resistance 80. The present invention is designed to guard against unauthorized start-up of the engine. In other words, the present invention is designed to prevent the vehicle from being stolen.

Note that the controller module 40 may also allow passage of relatively larger currents (by closing the relay circuitry 64) for starting up the engine when a predetermined security identification is received by the controller module

40. The predetermined security identification may be a sequence of relatively smaller currents as detected by the current detector 30, or it may be in the form of a passcode, physical identifications such as the presence of a security card, or other biometrics information which is unique to the vehicle's owner, or both.

Figure 3:
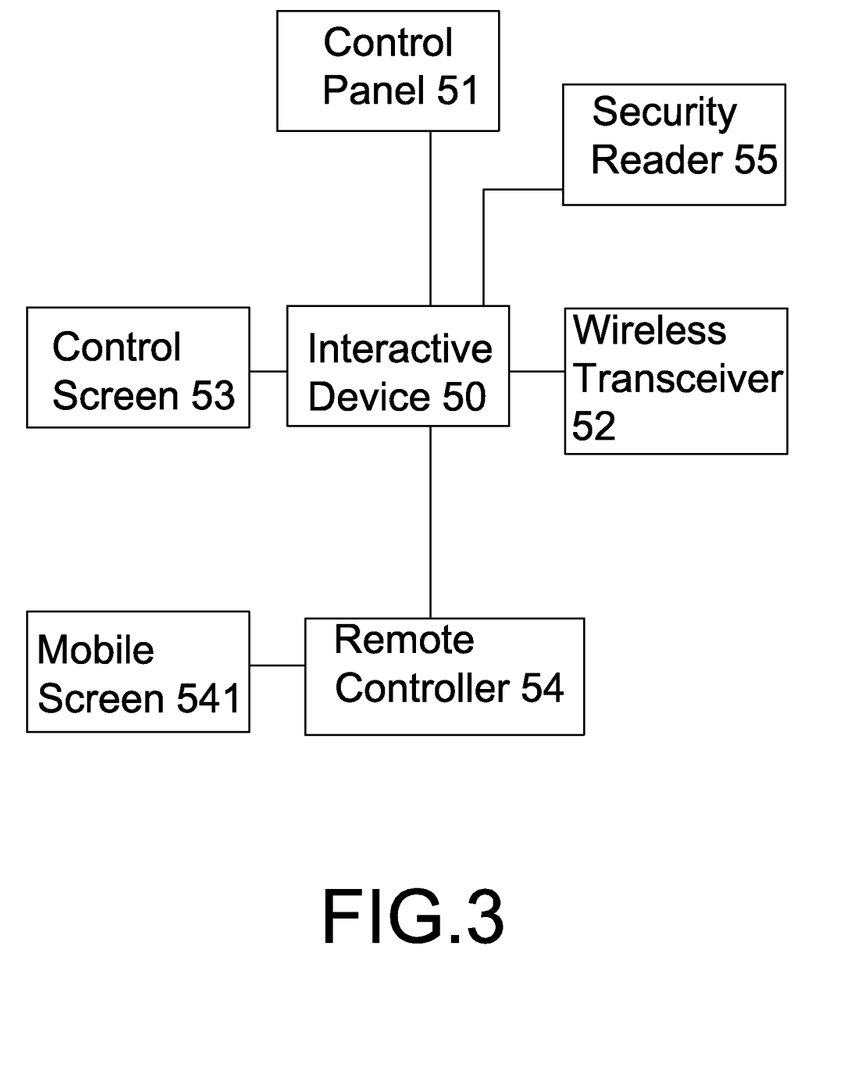
FIG. 3 is a block diagram of an interactive device of the security battery apparatus according to the preferred embodiment of the present invention.

In other words, the security battery module further comprises an interactive device 50 electrically connected to the controller module 40 for allowing input of the predetermined unlock code. The interactive device 50 may comprise a control panel 51 provided on the vehicle for allowing a user to input characters or numerals to unlock the relatively larger current by the controller module 40. The control panel 51 may be embodied as a key pad or a touch-screen device for allowing the authorized user of the vehicle to input the predetermined unlock code.

The interactive device 50 may further comprise a wireless transceiver 52 electrically connected to the controller module 40 for wirelessly communicating with the control panel 51. This wireless communication allows authorized user of the vehicle to enter the predetermined passcode in a wireless manner. Accordingly, the interactive device 50 further comprises a remote controller 54 wirelessly communicating with the wireless transceiver 52 for wirelessly controlling an operation of the control module 40.

The interactive device 50 may further comprise a security reader 55 provided on the vehicle for reading a predetermined form of security identification information from a predetermined media. For example, the security reader 55 may be embodied as a card reader, wherein a user may possess a card having a magnetic strip containing a passcode for triggering activation of the relay circuitry 64. As another example, the security reader 55 may be embodied as a Radio Frequency Identification Reader (RFID), wherein a user may possess a RFID tag for transferring the passcode to the security reader 55.

The remote controller 54 may be incorporated in an existing wireless device, such as a smartphone or a tablet computer, such that the authorized user of the vehicle may be able to wirelessly "unlock" the vehicle by entering the passcode via his or her smartphone or tablet computer. The interactive device 50 may further comprise a control screen 53 mounted in the vehicle for displaying an operation status of the controller module 40. For example, the user of the present invention may visually monitor the security status of the vehicle or reset the passcode by looking at the control screen 53. On the other hand, the remote controller 54 may also be equipped with a mobile screen 541 for allowing the user of the present invention to monitor the status of his vehicle at a distance.

It is worth mentioning that the security identification may be pre-programmed when the present invention is manufactured, or it can be freely inputted or determined by the user through operation of a predetermined software by using the interactive device 50.

The security battery apparatus further comprises a security device 60 which comprises an alarm device 61 electrically connected to the controller module 40 for generating alarm signals when unauthorized attempts to turn on the vehicle is detected. For example, when a user enters an incorrect passcode for a predetermined number of times via the control panel 51, the controller module 40 may be programmed to activate the alarm device 60 to generate an alarm signal. The alarm signal may be in the form of an analog signal such as sounds of elevated magnitude, or an electrical signal alerting law enforcement or security agencies, or both. In this case, the alarm device 61 may be embodied as a speaker.

The security battery apparatus further comprises a Global Positioning System 63 (GPS) provided in the security housing 10 and electrically connected to the controller module 40 for delivering positioning information of the vehicle. This feature allows the user or law enforcement agencies to rapidly locate the vehicle when it is stolen.

In order to further enhance the security feature of the present invention, the security device 60 further comprises a surveillance device 62 provided on the security housing 10 or in the vehicle and electrically connected to the controller module 40 for capturing an image and audible sound in a predetermined area. For example, when authorized attempts to unlock the passcode is detected, the surveillance device 62 may be activated to capture the video and record any audible sound in the predetermined area. Thus, the surveillance device 62 may comprise a video camera 621 and a microphone 622 mounted in the security housing 10 or in the vehicle for capturing the video or recording the sound in the predetermined area. The predetermined area may be the cabinet of the vehicle, or the space covered by the hood.

Figure 4:
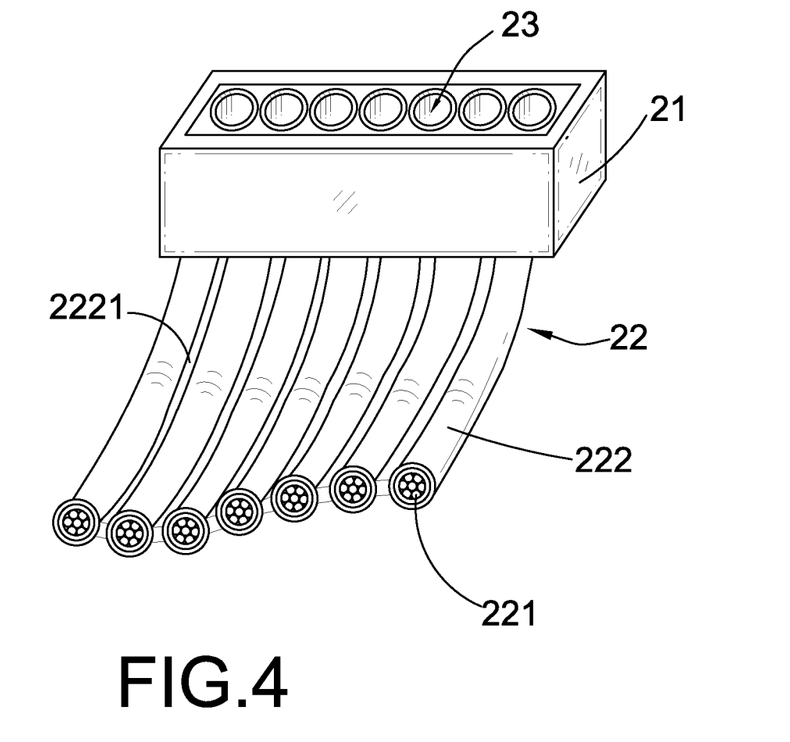
FIG. 4 is a schematic diagram of the security adapter according to the preferred embodiment of the present invention.
Figure 5:
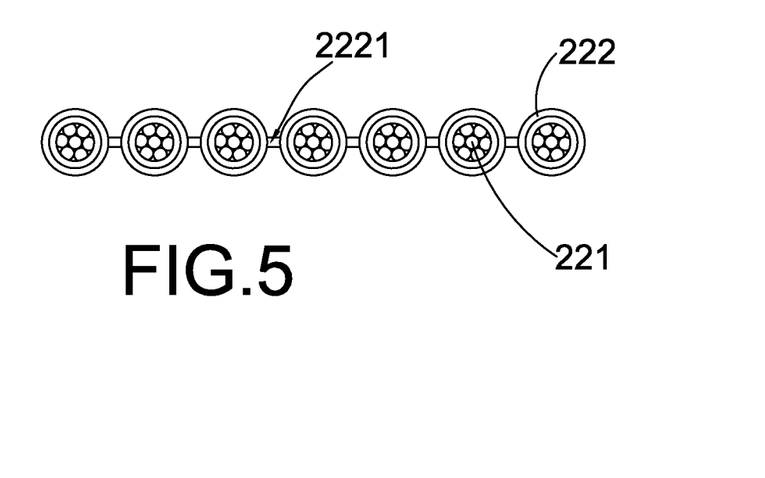
FIG. 5 is a sectional view of the security adapter according to the preferred embodiment of the present invention.

Referring to FIG. 4 of the drawings, the security adapter 20 comprises an adaptor body 21 securely mounted in the security housing 10, and a connecting cable 22 connecting the positive terminal 71 of the rechargeable battery 70 to the adapter body 21. The adapter body 21 is elongated in shape and constitutes a security terminal 23 for the rechargeable battery 70. Furthermore, the connecting cable 22 comprises a plurality of cable members 221 extending between the positive terminal 71 and the adapter body 21 for conducting electricity between the rechargeable battery 70 and the security terminal 23. The connecting cable 22 further comprises an outer protective cover 222 accommodating the cable members 221 which are bounded together to form a substantially flat contour. The result is that the outer protective cover 222, which is flexible and flat in shape, extends between the rechargeable battery 70 and the adapter body 21 for conducting electricity between the rechargeable battery 70 and the security terminal 23. Moreover, the outer protective cover 222 is configured to form a plurality of insulating portions 2221 to insulate each two cable members 221. The reason for such a construction is to substantially increase the difficulty of jump-starting the vehicle by cutting the connecting cable 22 and re-wiring the connecting cable 22 to some other cables which are used to start the engine of the vehicle and by pass the controller module 40.

It is important to mention at this stage that the controller module 40 may be pre-programmed to offer many variations of security protection to the vehicle. This controller module 40 may respond to variations of the currents detected by the current detector 30. These current change may correspond to a security breach. When the vehicle is at rest and the engine is turned off, the electricity consumption of the vehicle is at its minimum. The current drawn from the rechargeable battery 70 is also at its minimum, namely $I_1$. This current may be required by such equipment as clocks etc. When the door of the vehicle is opened, lights may be turned on and the current drawn from the rechargeable battery 70 increases. This current may be referred to as $I_2$. When the engine of the vehicle is being started, the current drawn from the rechargeable battery 70 is at its maximum, and this current may be referred to as $I_3$. In the situation described above, $I_1 < I_2 < I_3$.

The controller module 40 may be programmed such that when either 12 or 13 is detected but a passcode has not been entered (i.e. a security breach), the alarm device 61 and the surveillance device 62 may be activated to signal for possible intrusion on the vehicle. At this moment, the controller module 40 may cut off the electricity required to start the engine so as to prevent the vehicle from being stolen by maintaining the relay circuitry 64 to be opened.

On the other hand, when a predetermined sequence of relatively smaller currents are detected, such as three relatively smaller currents are drawn from the rechargeable battery 70, the controller module 40 may activate the relay circuitry 64 so as to close the electrical connection between the rechargeable battery 70 and the security adapter 20. As such, the relatively smaller currents constitute the security identification for starting the vehicle. The security identification may contain more than one form of identifications. For example, a predetermined sequence of relatively smaller currents and a passcode may be required to trigger activation of the relay circuitry 64.

An alternative mode of ensuring security is that the relay circuitry 64 is normally closed so that the engine of the vehicle may be started by default. However, when the controller module 40 has detected any unauthorized drawing of currents (such as $I_2$ or $I_3$) without proper security identification (such as the input of a predetermined passcode), the controller module 40 is arranged to activate the relay circuitry 64 so as to selectively cut off the electricity connection between the rechargeable battery 70 and the security terminal 23 of the security adapter 20. As a result, the engine will not acquire adequate current to be started, and the vehicle is prevented from being stolen.

Figure 6:
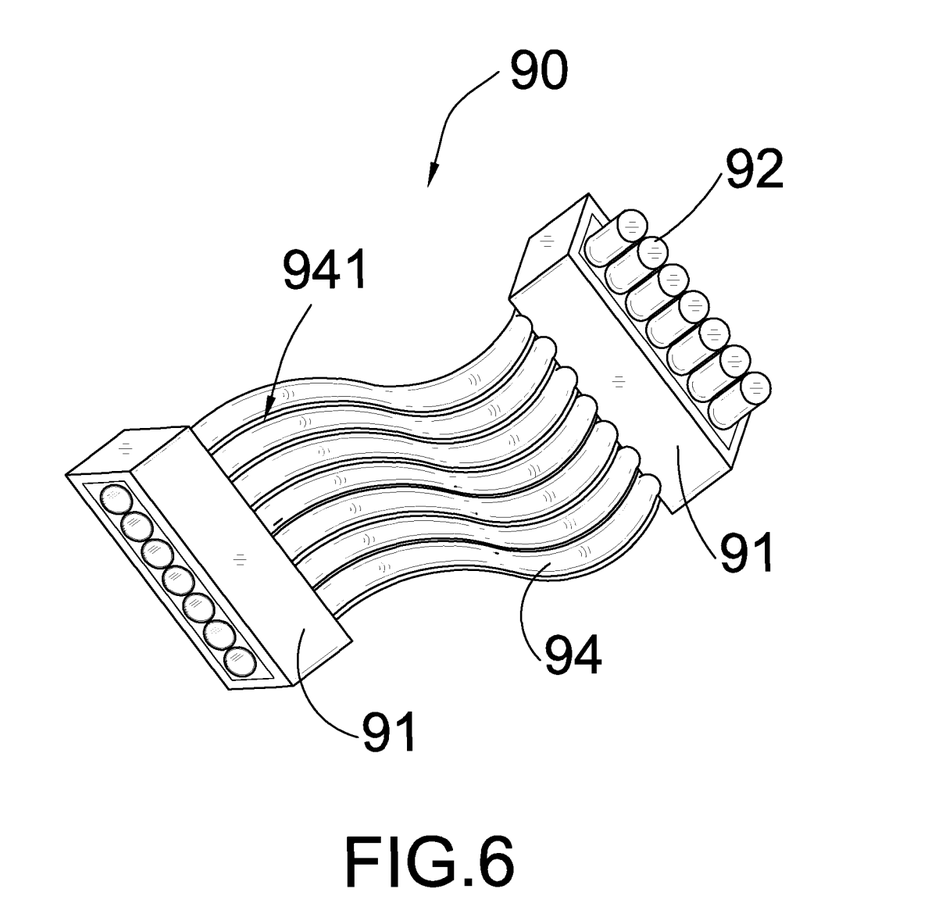
FIG. 6 is a schematic diagram of a security cable of the security battery apparatus according to the preferred embodiment of the present invention.

As shown in FIG. 6 of the drawings, the security battery apparatus may further comprise a security cable 90 detachably connected to the security adapter 20 for electrically connecting the security adapter 20 to the electrical components of the vehicle. The security cable is structurally similar to the connecting cable 22 of the security adapter 20 so that an authorized person may not easily acquire electricity from the rechargeable battery 70 by cutting the security cable 90 and jump-start the security cable.

Figure 7:
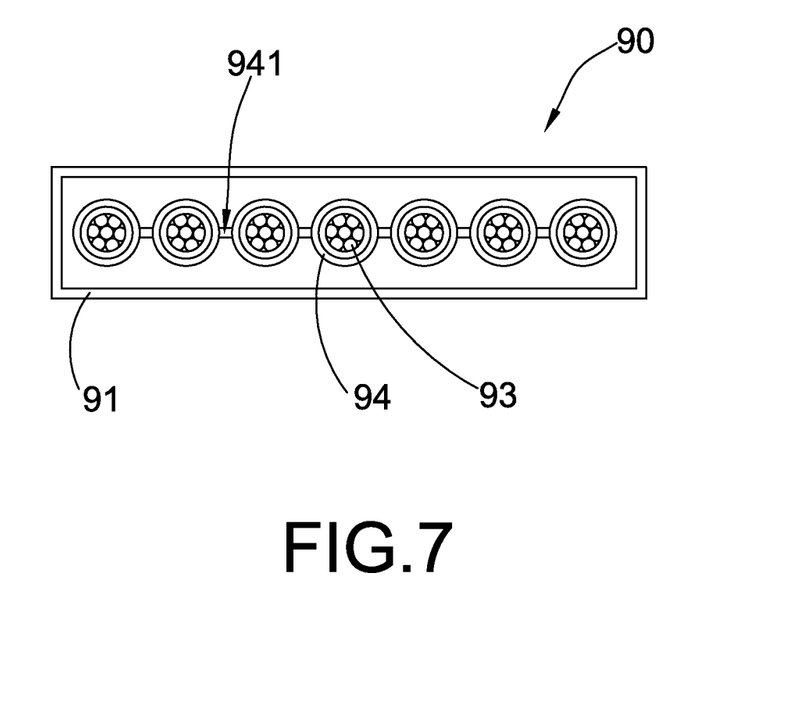
FIG. 7 is a sectional side view of the security cable of the security battery apparatus according to the preferred embodiment of the present invention.
Figure 8:
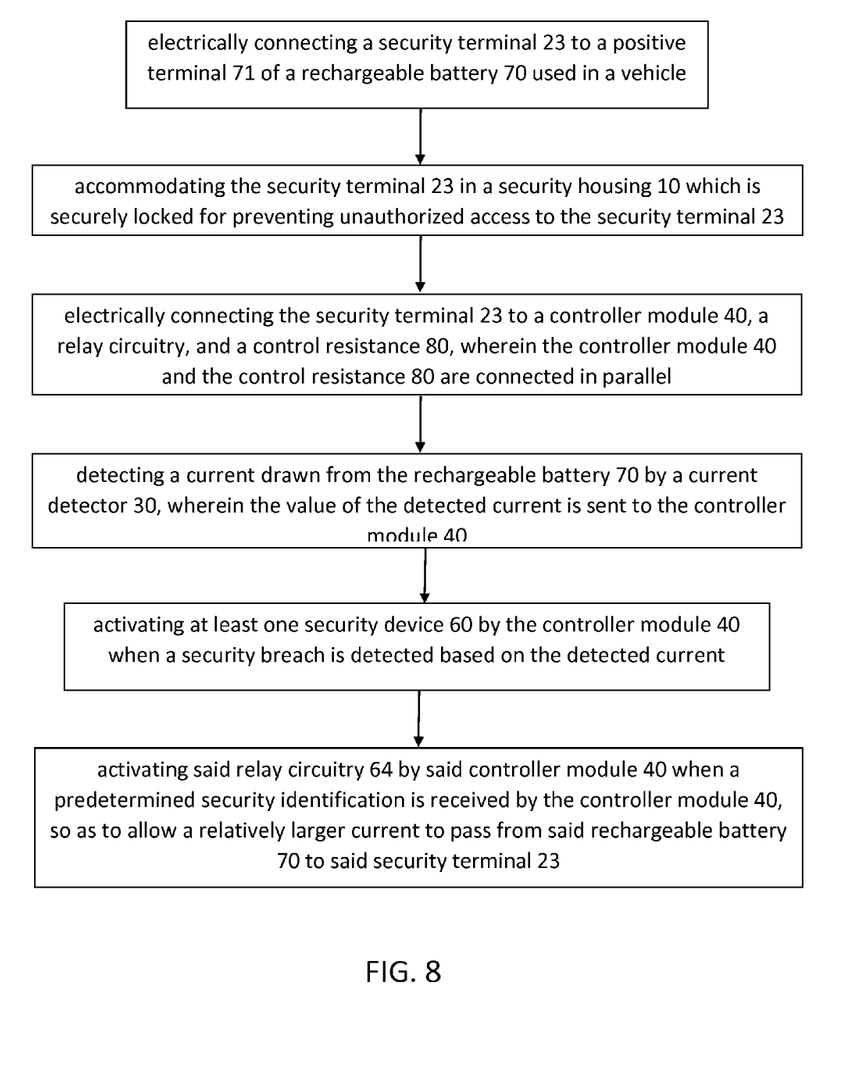
FIG. 8 is a method of preventing unauthorized start-up of a vehicle according to the preferred embodiment of the present invention.

In other words, the security cable 90 comprises two security connectors 91 each of which is elongated in shape and constitutes a terminal 92 of the security cable 90. The security cable 90 comprises a plurality of the cable wires 93 extending between the two security connectors 91 for conducting electricity between the security adapter 20 and the other components of the vehicle. The security cable 90 further comprises a cable cover 94 accommodating the cable wires 91 which are bounded together to form a substantially flat contour. The cable cover 94 is configured to form a plurality of insulating 941 to insulate each two cable wires 93.

It is worth mentioning that the security cable 90 may come with the security battery apparatus. Alternatively, it may be separately sold and connect to a conventional main electrical cable of a vehicle by using a suitable adapter.

Referring to FIG. 7 of the drawings, a method of preventing unauthorized start-up of a vehicle is illustrated. The method comprises the steps of:

(a) electrically connecting a security terminal 23 to a positive terminal 71 of a rechargeable battery 70 used in a vehicle;

(b) accommodating the security terminal 23 in a security housing 10 which is securely locked for preventing unauthorized access to the security terminal 23;

(c) electrically connecting the security terminal 23 to a controller module 40, a relay circuitry 64 which is normally opened and connected to said controller module 40, and a control resistance 80, wherein the controller module 40 and the control resistance 80 are connected in parallel so as to normally allow a relatively smaller current to pass from said rechargeable battery 70 to said security terminal 23 through said control resistance 80;

(d) detecting a current drawn from the rechargeable battery 70 by a current detector 30, wherein the value of the detected current is sent to the controller module 40;

(e) activating at least one security device 60 by the controller module 40 when a security breach is detected based on the detected current; and (f) activating said relay circuitry 64 by said controller module 40 when a predetermined security identification is received by the controller module 40, so as to allow a relatively larger current to pass from said rechargeable battery 70 to said security terminal 23.

It is important to reiterate that the key subject matter of the present invention is to prevent unauthorized start of the vehicle through detection of currents drawn from the rechargeable battery 70. When a passcode is entered, the controller module 40 may allow drawing of a relatively larger current from the rechargeable battery 70. The passcode may be in the form of a passcode entered through the interactive device 50, or in the form of a currents pattern as detected by the current detector 30, or both. When the required passcode is not entered or detected, a possible security breach is suspected. When this happens, the controller module 40 is arranged or pre-programmed to activate the security device 60 to prevent the unauthorized start of the vehicle.

Figure 9:
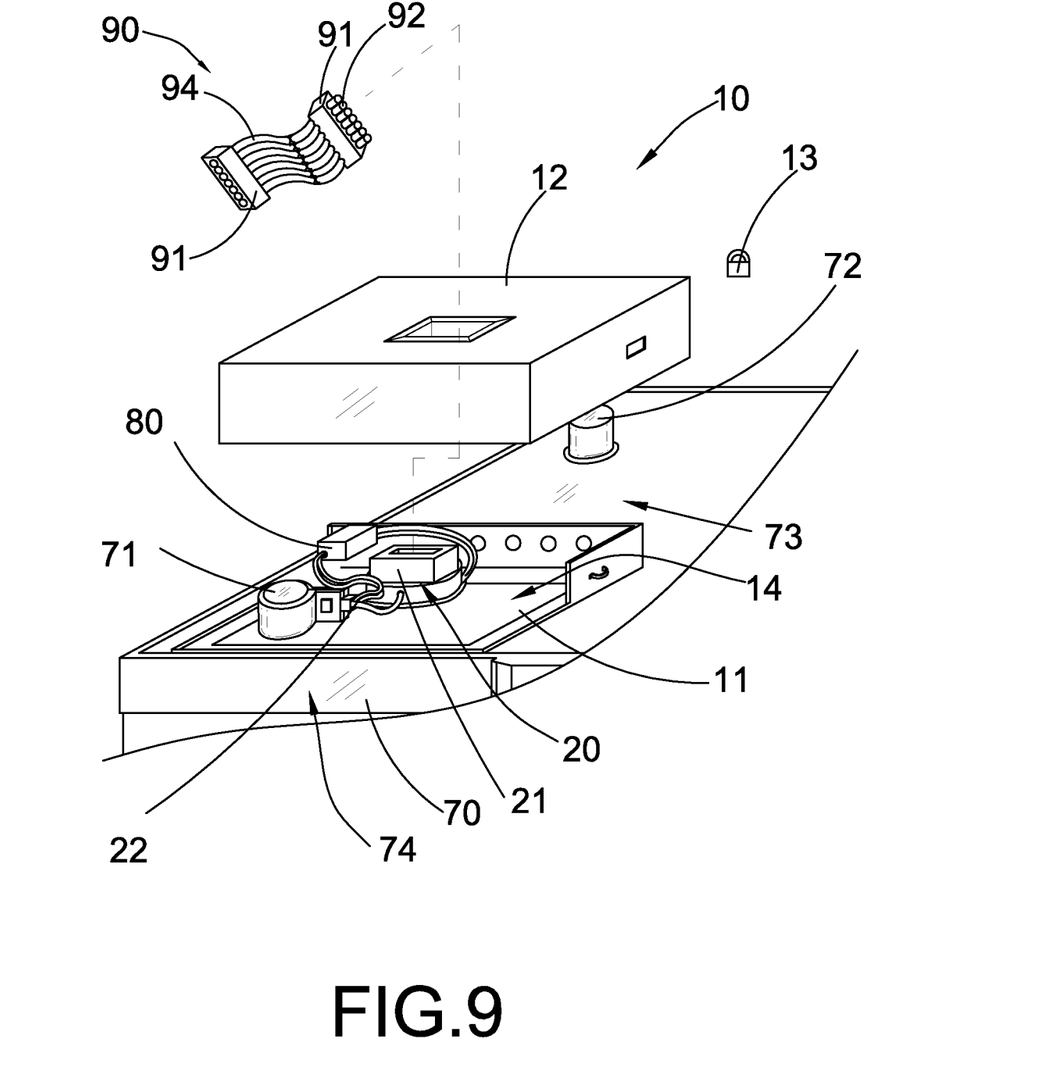
FIG. 9 is an alternative mode of a security battery apparatus according to the preferred embodiment of the present invention.

Referring to FIG. 9 of the drawings, an alternative mode of the security battery apparatus according to the preferred embodiment of the present invention is illustrated. The alternative mode is similar to the preferred embodiment as described above, except the connecting cable 22' of the security adapter 20'. According to the alternative mode of the present invention, the connecting cable 22' is a conventional cable connecting between the positive terminal 71 of the rechargeable battery 70 and the adapter body 21 and the control resistance 80. In other words, the connecting cable 22' used in the security adapter 20' may either be a conventional cable for use in a vehicle, or the connecting cable 22 described in the preferred embodiment.

The present invention, while illustrated and described in terms of a preferred embodiment and several alternatives, is not limited to the particular description contained in this specification. Additional alternative or equivalent components could also be used to practice the present invention.

What is claimed is:

1. A security battery apparatus for a vehicle which has a rechargeable battery having a positive terminal and a negative terminal, said security battery module comprising:

a security housing covering at least said positive terminal of said rechargeable battery of said vehicle, wherein said security housing comprises a first housing member mounted on said rechargeable battery, a second housing member detachably mounted on said first housing member, and a locking device provided on said first housing member and said second housing member for selectively and normally locking said first housing member with said second housing member;

a security adapter provided on said security housing and electrically connected to said positive terminal of said rechargeable battery;

a current detector electrically connected to said security adapter;

a control resistance electrically connected to said positive terminal of said rechargeable battery;

a relay circuitry electrically connected to said positive terminal of said rechargeable battery, and is connected to said control resistance in parallel, said relay circuitry being normally opened so that only a relatively smaller current is allowed to pass through said security adapter through said control resistance; and a controller module which is received in said security housing and electrically connected to said relay circuitry, said controller module being programmed to electrically activate said relay circuitry when a security identification is received, so as to allow a relatively larger current to by-pass said control resistance and pass through said security adapter for starting up said vehicle.

2. The security battery apparatus, as recited in claim 1, wherein said security identification is at least one of a predetermined sequence of currents of a predetermined amplitude as detected by said current detectors, and a predetermined passcode.

3. The security battery apparatus, as recited in claim 2, wherein said security adapter comprises an adaptor body securely mounted in said security housing, and a connecting cable connecting said positive terminal of said rechargeable battery to said adapter body.

4. The security battery apparatus, as recited in claim 3, wherein said adapter body is elongated in shape and constitutes a security terminal for said rechargeable battery, said connecting cable comprising an outer protective cover and a plurality of cable members extending between said positive terminal and said adapter body for conducting electricity between said rechargeable battery and said security terminal, said cable members being accommodated in outer protective cover to form a substantially flat contour of said connecting cable.

5. The security battery apparatus, as recited in claim 3, further comprising an interactive device electrically connected to said controller module for allowing input of said security identification.

6. The security battery apparatus, as recited in claim 4, further comprising an interactive device electrically connected to said controller module for allowing input of said security identification.

7. The security battery apparatus, as recited in claim 5, wherein said interactive device comprises a control panel provided on said vehicle.

8. The security battery apparatus, as recited in claim 6, wherein said interactive device comprises a control panel provided on said vehicle.

9. The security battery apparatus, as recited in claim 7, wherein said interactive device further comprise a wireless transceiver electrically connected to said controller module for wirelessly communicating with said control panel, and a remote controller wirelessly communicating with said wireless transceiver.

10. The security battery apparatus, as recited in claim 8, wherein said interactive device further comprise a wireless transceiver electrically connected to said controller module for wirelessly communicating with said control panel, and a remote controller wirelessly communicating with said wireless transceiver.

11. The security battery apparatus, as recited in claim 5, wherein said interactive device further comprise a control screen mounted in said vehicle for displaying an operation status of said controller module.

12. The security battery apparatus, as recited in claim 9, wherein said interactive device further comprise a control screen mounted in said vehicle for displaying an operation status of said controller module.

13. The security battery apparatus, as recited in claim 5, wherein said interactive device further comprise a security reader mounted in said vehicle for reading said security identification.

14. The security battery apparatus, as recited in claim 12, wherein said interactive device further comprise a security reader mounted in said vehicle for reading said security identification.

15. The security battery apparatus, as recited in claim 2, further comprising a security device which comprises an alarm device electrically connected to said controller module for generating alarm signals when unauthorized attempts to start said vehicle is detected.

16. The security battery apparatus, as recited in claim 5, further comprising a security device which comprises an alarm device electrically connected to said controller module for generating alarm signals when unauthorized attempts to start said vehicle is detected.

17. The security battery apparatus, as recited in claim 15, wherein said security device further comprises a surveillance device provided on said security housing and electrically connected to said controller module for capturing an image and audible sound in a predetermined area.

18. The security battery apparatus, as recited in claim 16, wherein said security device further comprises a surveillance device provided on said security housing and electrically connected to said controller module for capturing an image and audible sound in a predetermined area.

19. A security battery apparatus for a vehicle which has a rechargeable battery having a positive terminal and a negative terminal, said security battery module comprising:

a security housing covering at least said positive terminal of said rechargeable battery of said vehicle;

a security adapter provided on said security housing and electrically connected to said positive terminal of said rechargeable battery;

a current detector electrically connected to said security adapter;

a control resistance electrically connected to said positive terminal of said rechargeable battery;

a relay circuitry electrically connected to said positive terminal of said rechargeable battery, and is connected to said control resistance in parallel, said relay circuitry being normally opened so that only a relatively smaller current is allowed to pass through said security adapter through said control resistance;

a controller module which is received in said security housing and electrically connected to said relay circuitry, said controller module being programmed to electrically activate said relay circuitry when a security identification is received, so as to allow a relatively larger current to by-pass said control resistance and pass through said security adapter for starting up said vehicle; and a security cable detachably connected to said security adapter for electrically connecting said security adapter other electrical components of said vehicle, said security cable comprising two security connectors, a plurality of the cable wires extending between said two security connectors, and a cable cover accommodating said cable wires which are bounded together to form a substantially flat contour.

20. The security battery apparatus, as recited in claim 5, further comprising a security cable detachably connected to said security adapter for electrically connecting said security adapter other electrical components of said vehicle, said security cable comprising two security connectors, a plurality of the cable wires extending between said two security connectors, and a cable cover accommodating said cable wires which are bounded together to form a substantially flat contour.

21. The security battery apparatus, as recited in claim 18, further comprising a security cable detachably connected to said security adapter for electrically connecting said security adapter other electrical components of said vehicle, said security cable comprising two security connectors, a plurality of the cable wires extending between said two security connectors, and a cable cover accommodating said cable wires which are bounded together to form a substantially flat contour.

22. A method of preventing unauthorized start-up of a vehicle, comprising the steps of:
 (a) electrically connecting a security terminal to a positive terminal of a rechargeable battery used in a vehicle;
 (b) accommodating said security terminal in a security housing which is securely locked for preventing unauthorized access to said security terminal;
 (c) electrically connecting said security terminal to a controller module, a relay circuitry which is normally opened and connected to said controller module, and a control resistance, wherein said controller module and said control resistance are connected in parallel so as to normally allow a relatively smaller current to pass from said rechargeable battery to said security terminal through said control resistance;
 (d) detecting a current drawn from said rechargeable battery by a current detector, wherein said value of said detected current is sent to said controller module;
 (e) activating at least one security device by said controller module for generating an alarm signal when a security breach is detected based on said detected current; and
 (f) activating said relay circuitry by said controller module when a predetermined security identification is received by said controller module, so as to allow a relatively larger current to pass from said rechargeable battery to said security terminal, wherein said security housing comprises a first housing member mounted on said rechargeable battery, a second housing member detachably mounted on said first housing member, and a locking device provided on said first housing member and said second housing member for selectively and normally locking said first housing member with said second housing member.

23. The method, as recited in claim 22, wherein said security identification is at least one of a predetermined sequence of said currents each having a predetermined amplitude detected by said current detector, and a predetermined passcode.

24. The method, as recited in claim 23, wherein said security identification is inputted to said controller module through an interactive device which is electrically connected to said controller module.

25. The method, as recited in claim 24, wherein said interactive device comprises at least one of a control panel provided on said vehicle, a wireless transceiver electrically connected to said controller module, a control screen mounted in said vehicle, and a security reader mounted in said vehicle.

26. The method, as recited in claim 25, wherein said alarm signal is at least one of audible sound delivered by a speaker and an electrical signal transmitted to a predetermined law enforcement agency.

27. The method, as recited in claim 26, said step (e) comprises a step of recording a video and sound in a predetermined area.

* * * * *